Sept. 14, 1954     P. H. RICHERT     2,689,182

FRUIT HYDRATING METHOD AND APPARATUS

Filed Dec. 16, 1950     2 Sheets-Sheet 1

PAUL H. RICHERT
INVENTOR

HUEBNER, BEEHLER,
WORREL & HERZIG
ATTORNEYS

BY Richard M. Worrel

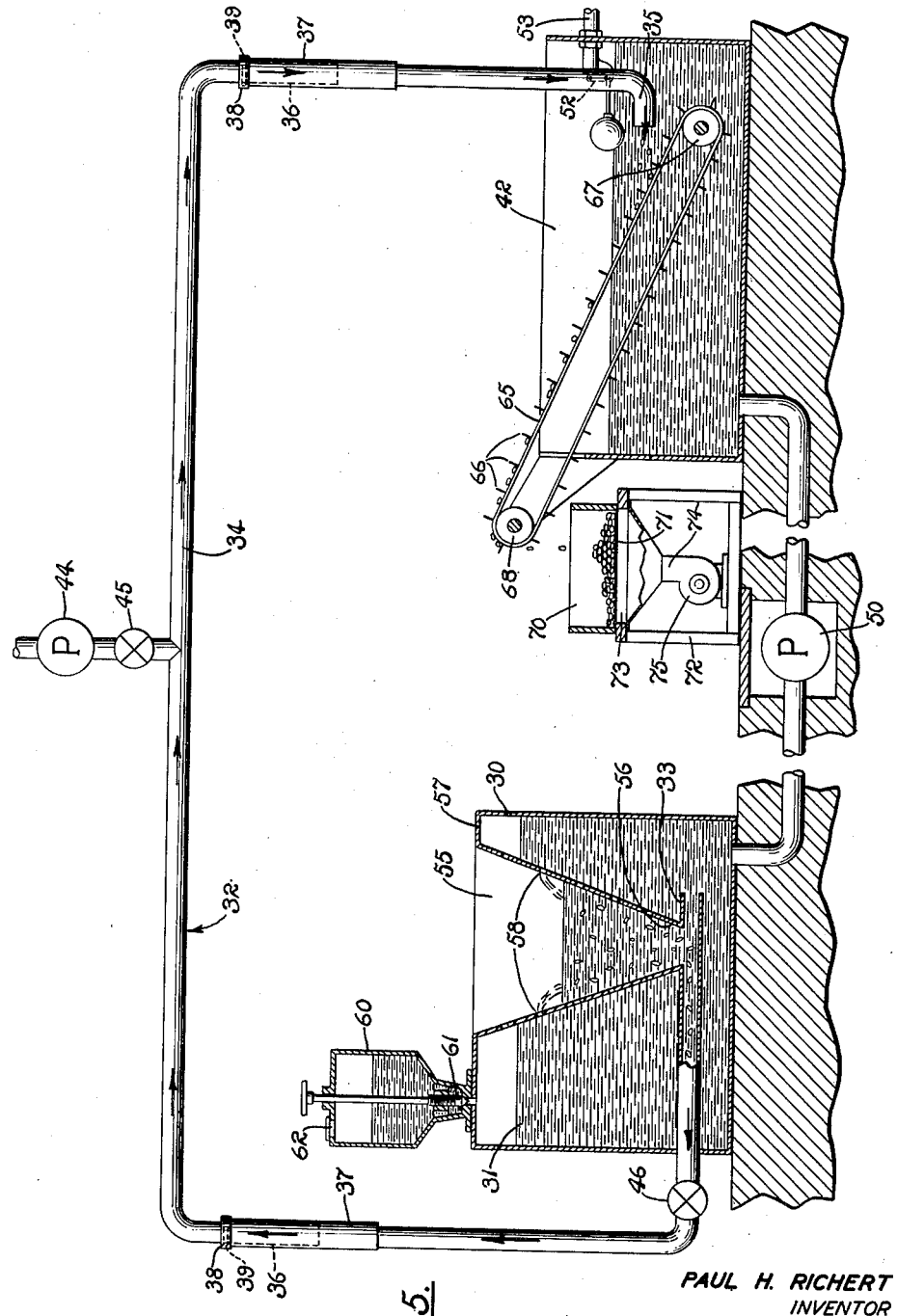

Patented Sept. 14, 1954

2,689,182

UNITED STATES PATENT OFFICE 2,689,182

FRUIT HYDRATING METHOD AND APPARATUS

Paul H. Richert, Fresno, Calif.

Application December 16, 1950, Serial No. 201,101

8 Claims. (Cl. 99—100)

The present invention relates to the hydration of fruit and the like and more particularly to an apparatus suited to the continuous processing of fruit to increase the moisture content thereof as well as to introduce liquid borne materials into the fruit.

Dried fruits are frequently excessively dehydrated during their curing. Extensive dehydration also is deliberately practiced in the preconditioning of dried fruits for storage and/or transportation. Such dehydration decreases the weight, hardens the fruit for resistance to damage, and has a general preserving effect. Conditioning of the fruit for market is largely a matter of increasing the moisture content thereof and occasionally the performing of such incidental operations as recleaning, disinfecting, fumigating and the like.

Fruits that are cut or sliced for drying purposes and dried fruits having pervious skins are generally not difficult to treat to increase their moisture content. Subjecting such dried fruits to steam baths, immersion, or even humid environments for adequate periods of time successfully conditions the fruit for market. One or more of these procedures is generally satisfactory for raisins and dried peaches, pears, apples, apricots, and the like although sugar and flavor leaching sometimes occurs.

Other fruits that are not cut or sliced for drying purposes and that have relatively impervious skins are exceedingly difficult to hydrate. Some such fruits have skins which not only are impervious to water but cannot be subjected to water, steam, or water vapor for any appreciable length of time without splitting, cracking, spotting or otherwise deteriorating. These problems are encountered in an aggravated form in the hydration of dates for market and the present invention is described in connection therewith.

Many dates are excessively dry when harvested. If of high moisture content, they are dehydrated either in the maturation rooms or in special dehydrators provided for the purpose. When it is desired to increase the moisture content to suit consumer preference, it is the conventional practice to place the dates in thin layers on trays which are stacked in humid rooms for many hours. This procedure is exceedingly slow, expensive, changes the characteristics of the product, and restricts the processing to low capacity operations. The temperature must not be too high nor the exposure too long or excessive darkening takes place. The skin of the dates is also subject to superficial breaks or check. Further, mildew, decay, sugar spotting and the like make careful control necessary.

Increase in temperature increases the speed of hydration but is destructive to the desired golden color. The epicarp splits when subjected to hot water or steam, ruining the dates for preferred commercial use. Further, when dates are heated, their sucrose content, which makes up about 75% of their weight, tends rapidly to hydrolyze and invert to form the sticky sugar characteristic of many imported dates.

My copending United States patent application Serial Number 75,733, filed February 10, 1949, which is now abandoned relating to a Process for Softening Dates, Figs and Other Dried Food Products disclosed a process effectively solving the above described difficulties by subjecting the fruit to a vacuum while immersed in a moistening fluid and subsequently breaking the vacuum. The vacuum serves to withdraw air and gas from voids in the fruit and the breaking of the vacuum while the fruit is immersed to replace the evacuated air or gas with the fluid of immersion. The instant invention implements the process described by the provision of an improved apparatus for performing the same.

An object of the present invention is to provide an apparatus adapted to subject material processed therein to reduced pressure and to a return to atmospheric pressure while immersed in a treating fluid.

Another object is to provide an improved apparatus for increasing the moisture content of dried dates, figs, and other dry materials having relatively impervious protective skins or coatings.

Another object is to provide an apparatus of the character and for the purposes set forth that is adjustable accurately to regulate additional moisture content imparted to fruit and the like processed therein.

Another object is to provide an apparatus for softening dried fruits and the like adapted concurrently to impart thereto increased sugar or flavor content, or fumigating or distinfecting materials, as desired.

A further object is to reduce the conventional treat-time for the hydration of dates and the like from many hours to a few minutes or even a fraction of a minute, when desired.

A still further object is to provide an apparatus adapted to hydrate increased volumes of fruits with improved uniformity and control in appreciably shorter periods and thereby substantially to reduce processing expenses and requisite capital investments for the purpose.

Other objects and advantages will become apparent in the subsequent description.

In the drawing:

Fig. 5 is a somewhat enlarged longitudinal section of the apparatus shown in Fig. 3.

Figure 1:
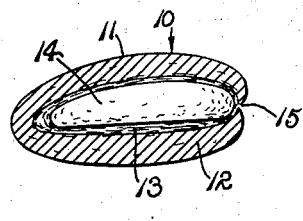
Fig. 1 is a longitudinal section of a date provided for illustrative convenience in describing the performance of the present invention.

Referring in greater detail to the drawings:

In Fig. 1 a date 10 is illustrated in longitudinal section revealing a hard, relatively impervious skin or epicarp 11, surrounding the flesh 12 which has a fibre lined pit well 13 therein containing an elongated pit or seed 14. The date has a stem end 15 which provides a small opening through the epicarp and flesh into the pit well. As shown, mature dates provide a considerable space in the pit well about the pit. As is well known, the epicarp, although usually and generally impervious to air and water, cracks and peels off when subjected to water for an appreciable period of time or to heat.

Figure 2:
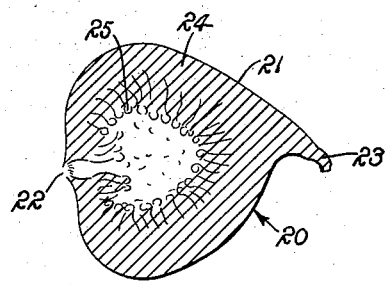
Fig. 2 is a longitudinal section of a dried fig characterizing dried fruits generally whose hydration problems have been considered difficult to overcome but which the device of the present invention is adapted to process.
Figure 3:
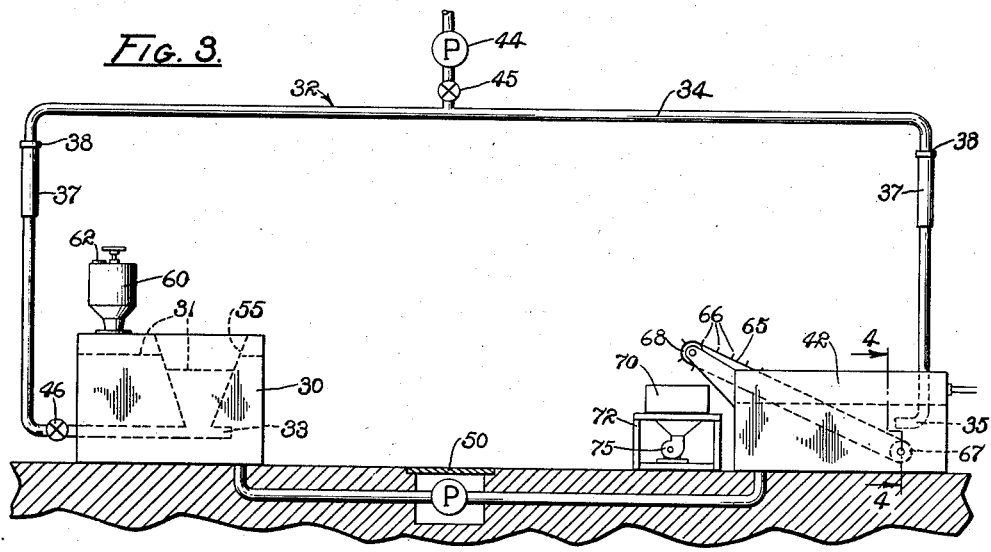
Fig. 3 is a side elevation of a hydration apparatus embodying the principles of the present invention.
Figure 4:
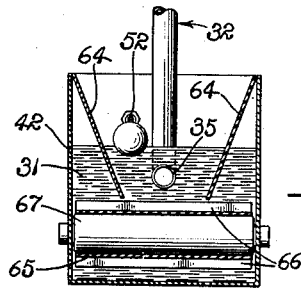
Fig. 4 is a vertical section on line 4—4 of Fig. 3.

A fig 20 is shown in Fig. 2 characteristic of dried fruits suitably processed in the subject invention. The fig has an outer wall 21 which protects the interior of the fig from microorganisms and insects during a considerable portion of its maturation. The wall is tough and relatively impervious to water but provides an open eye 22 at maturity opposite to a stem end 23. Immediately inside the wall 21 is the saccharine pulp 24 inwardly from which is extended enlarged fleshy florets 25. Not only does the outer wall protect the fig from microorganisms and insects but it shields the fig from water when soaked for the purposes of softening, disinfecting, liquid fumigating or the like. The fig contains a relatively large air pocket accessible through the eye but which receives relatively little liquid during soaking because of the surface tension of the liquid exerted in blocking relation to the eye.

The illustrated date and fig suitably exemplify fruits whose hydration problems are readily overcome by the apparatus of the subject invention. In connection with the use of the term "hydration" it is to be understood that the word is used in the popular sense of imparting moisture to an article rather than in the technical chemical sense of the union of molecules of water with a molecule or atom.

A feed tank 30 of stainless steel or other sheet metal or the like is provided to receive water 31 or other liquid in which articles such as dates 10 or figs 20 are to be treated. A fluid conduit or siphon tube 32 is provided with an inlet 33 in the feed tank 30 preferably adjacent to the bottom thereof, an elevated central portion 34, and an outlet 35. Intermediate the inlet and the central portion and intermediate the central portion and the outlet, the tube is provided with telescopically related inner and outer portions 36 and 37. Packing nuts 38 are screw-threadably mounted on the outer 37 of the telescopically related portions. Suitable packing 39 is provided in the telescopic portions 37 in circumscribing relation to the respective inner telescopic portions 36 engageable by the nuts 38 to preclude leaking of the tube. The telescopic portions accommodate adjustable elevational positioning of the central portion relative to the inlet and the outlet.

A receiving tank 42 of stainless steel or other sheet metal or the like receives the outlet end 35 of the siphon tube 32 and is adapted to contain water 31 at a level lower than the water in the feed tank so that a siphon flow may be maintained through the tube.

An air pump 44 is preferably connected to the central portion 34 of the siphon tube 32 by means of a valve 45. With water in the feed tank and receiving tank, the pump 44 is employed to evacuate air from the tube and draw water upwardly from the tanks to fill the tube. When the tube is filled, the valve 45 is closed and a siphon action initiated through the tube from the feed tank to the receiving tank.

To interrupt the siphoning action and yet to maintain a static column of water in the tube, a manually controlled valve 46 is provided in the conduit at an elevation preferably approximating that of the inlet 33 and/or outlet 34.

It will be apparent that the siphon action through the tube 32 will tend to convey water 31 from the feed tank 30 to the receiving tank 42 until the water is at the same level in both tanks and the fluid flow decreased to a static condition. To offset this tendency, a pump 50 is mounted in fluid communication between the feed tank 30 and receiving tank 42 of a capacity substantially equal to the flow of water or other fluid through the siphon tube. Even with the tanks separated a distance in excess of one hundred feet, it has been found satisfactory to balance the siphon flow and pump capacity so as to maintain the water or other fluid level in the feed tank 30 approximately four feet higher than the level in the receiving tank 42.

As will soon become apparent, treatment of fruit and the like in the apparatus gradually exhausts the water originally provided. It has been found most convenient to provide a float valve 52 in the deceiving tank 42 connected to a source of water under pressure 53. With the pump 50 returning water to the feed tank at the rate of siphon flow of water to the receiving tank, water exhausted from the system is reflected by a lowering of the water level in the receiving tank which, by means of the float valve 52, is readily replenished from the source of water under pressure 53.

A hopper 55 is mounted in the feed tank 30 and has a constricted lower end portion 56 in communication with the inlet end portion 33 of the siphon tube 32. The hopper conveniently is funnel shaped and mounted in position within the tank by suspension from a cover 57 provided therefor. The hopper is formed with a plurality of elevationally spaced bores 58 therethrough from a position adjacent to the tube 32 to the cover 57 of the tank. The bores provide auxiliary water inlet openings for the tube supplementing the water flow in the inlet end of the tube. Water level changes in the feed tank bring more or fewer bores below water level serving as an automatic regulation of water flow into the tube compensating for variations in siphon and pump balance during operation. This compensating effect has proved of substantial value in avoiding excessively critical balancing requirements.

For reasons soon to become apparent, an auxiliary tank 60 is mounted on the cover 57 and connected to the interior of the feed tank 30 through a metering valve 61. When it is desired to impart fluid borne materials to the fruit being treated, such materials are deposited in the tank 60 and metered into the tank by means of the metering valve 61. Frequently it is desirable to supplement the normal sugar content of the fruit by the addition of sugar in this manner. To control subsequent mold and fermentation, such materials as ethylene oxide, propylene oxide or other material is placed in the auxiliary tank and gradually fed into the water 31 where it is dissolved, suspended in emulsion form, or simply borne by the water due to its velocity of circulation. The auxiliary tank 60 is preferably provided with a large lid 62 permitting convenient access for cleaning purposes.

The receiving tank is preferably provided with downwardly convergent fruit directing walls 64. An endless conveyor 65 is mounted for circuitous travel with one end in the receiving tank 42 below the outlet 35 and an opposite end extended from the tank appreciably above the water level thereof. The end of the conveyor within the tank is arranged in closing relation to the convergent walls 64 so that the walls define a hopper having a movable bottom provided by the conveyor. The conveyor conveniently mounts transverse cleats 66 and is circuitously traveled about a driven roller 67 and an idler roller 68. A fruit receiving box 70 is provided below the extended end of the conveyor. Fruit transported up the conveyor is dropped into the box and normally bears so little surface water as to require no external drying. When external drying is preferred, the box 70 utilizes a screen 71 as a bottom. A stand 72 supports the box and provides an opening 73 in registration with the screen connected by means of a conduit 74 to an air blower 75 which is adapted to direct a stream of air upwardly through the screen 71 and processed fruit rested thereon.

Operation

The operation of the device of the present invention is believed to be clearly apparent and briefly summarized at this point. The apparatus is conditioned for operation by adjusting the central portion 34 of the siphon tube 32 to the desired height and the nuts 38 tightened against the packing 39 to preclude leaking. It will be apparent that the height of the central portion above the water levels in the tanks predetermines the extent of pressure reduction within the siphon tube when water or other fluid is siphoned therethrough. In the treatment of fruits generally a reduced pressure equivalent to from fifteen to thirty inches of mercury is employed. For most dates, a minimum pressure of twenty-two inches of mercury is excellently suited to the purpose and approximated by elevating the central portion 34 a distance of twenty-five feet above the water level of the feed tank 30.

The tanks 30 and 42 are filled with water as described and the pump 44 utilized to exhaust air from the siphon tube. When fruit of a type likely to be damaged by heat is to be processed, cool water is employed, tap water generally being satisfactory for the purpose. Any material such as sugar, ethylene oxide, propylene oxide, flavoring or the like desired to be imparted to the fruit processed is deposited in the auxiliary tank 60 and the metering valve 61 regulated to maintain the material content of the water at the desired level by replacing the material depleted by fruit absorption and removal from the system.

Concurrently with the initiation of the siphon action by opening the valve 46, the pump 50 is started and serves to return water siphoned into the receiving tank 42 to the feed tank 30. In successful commercial installations of the subject invention, a 4-inch I. D. pipe is employed as a siphon tube and with the central portion elevated twenty-five feet above the water level in the feed tank and from twenty-nine to thirty-one feet above the water level in the receiving tank. Three hundred gallons of water per minute are siphoned through the tube with the inlet 33 one hundred and twenty feet from the outlet 35. In such installations the pump 50 is adjusted to return three hundred gallons per minute to the feed tank. These installations conveniently handle as much as 60,000 pounds of dates in a normal eight hour day of operation.

Dates 10, or other materials to be hydrated, are deposited in the hopper 55 and descend in a swirling action into the inlet portion of the siphon tube where they are drawn by the siphon action through the tube and discharged from the outlet 35. During passage through the tube the dates are subjected to a reduced pressure determined by the elevation of the central portion 34 and air or gas contained in the pit wells 13 thereof evacuated to a corresponding extent. As the dates descend toward the outlet 35, the pressure gradually increases and the water 31, with any materials borne thereby for the purpose, is drawn into the pit wells through the stem ends 15 of the dates. It is obvious that the controlled evacuation of air and gas from the pit wells and its supplanting by the water and water borne material accurately regulates the addition of water and such material to the dates. When figs 20 are processed, air and gas is drawn from between the florets 25 and hollow interiors of the figs and supplanted by water or other liquid and liquid borne material.

The fruit is discharged onto the conveyor 65 and carried thereby upwardly for deposit into the box 70. For dates and most fruits, the surface water runs therefrom during conveyance from the receiving tank 42 and no subsequent external drying is required. If preferred, the blower 74 by directing air upwardly through the conduit 73 and screen 71 readily accomplishes the desired surface drying.

The water and other material contained in the dates, figs and the like rapidly permeates the flesh and other relatively soft interior material softening and hydrating the same to a condition dictated by consumer preference and regulated by elevational control of the central portion 34 of the tube 32. Sugar, flavoring or other material added to the fruit is also accurately controlled by the metering of the material into the water and/or regulating the volume of water imparted to the fruit.

Dates are considered excellently suited for the market when they contain approximately 25 to 30% by weight of water. Dates dehydrated for storage contain approximately 15% by weight of water, thus it is usually desirable to raise the moisture content thereof approximately 10%. The described adjustment of the apparatus with the central portion approximately twenty-five feet above the water level in the feed tank has been found to impart to dried dates of average dehydrated condition enough additional moisture to bring the total water content to above 10% by weight.

The apparatus of the present invention is successful in imparting accurately controlled amounts of liquid and liquid borne material to fruits and the like having air or gas pockets therein subject to evacuation or partial evacuation by a reduced environmental pressure. It will be apparent that syrups and other liquids may be substituted for the water in the apparatus and likewise imparted to the processed fruits and other materials in equally determinable amounts.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent devices and systems.

Having described my invention, what I claim as new and desire to secure by Letters Patent is:

1. A hydrating apparatus for dates comprising a feed tank; a receiving tank; a siphon tube having an inlet in the feed tank, an outlet in the receiving tank, and an elevated central portion, said tube being telescopic at opposite sides of the elevated portion whereby said portion can be adjustably raised and lowered; liquid in the tanks the inlet in the feed tank and the outlet in the receiving tank being located at predetermined positions in their respective tanks below the fluid levels therein; a pump connected to the elevated portion of the tube adapted to evacuate air therefrom; a hopper having perforated walls mounted in the feed tank in communication with the inlet of the tube; a float valve in the receiving tank connected to a source of liquid adapted to maintain the fluid in said tank at a predetermined lebel above perforations in the walls of the hopper; and a pump connected between the tanks adapted to pump liquid from the receiving tank into the feed tank at a rate substantially equal to the siphon fluid carrying capacity of the tube and to maintain liquid in the feed tank at a higher level than in the receiving tank.

2. A fruit hydrating apparatus comprising a feed tank open to atmospheric pressure; a receiving tank open to atmospheric pressure; fluid in the tanks; a siphon tube having a substantially horizontal portion providing an open end immersed in the fluid in the feed tank, an adjustably telescopic upwardly extended portion continuous with the horizontal portion, an elevated portion continuous with the upwardly extended portion, and an adjustably telescopic downwardly extended portion continuous with the elevated portion providing an open end immersed in the fluid in the receiving tank; a fruit receiving hopper having perforated downwardly convergent side walls mounted on the horizontal portion of the siphon tube immersed in the feed tank and in communication with the interior of the siphon tube through an upper wall of said horizontal portion; an auxiliary tank for fruit treating solutions mounted adjacent to the feed tank; a metering valve mounted in the auxiliary tank adapted to regulate flow of fruit treating solutions into the feed tank externally of the hopper; a pump connected to the elevated portion of the siphon tube adapted to evacuate air therefrom; and a pump interconnecting the tanks adapted to maintain the fluid level in the feed tank above the fluid level in the receiving tank whereby a siphoning of fluid from the feed tank and fluid from the hopper to the receiving tanks occurs.

3. A method of hydrating fruit comprising immersing the fruit in a liquid at substantially atmospheric pressure, siphoning the fruit and liquid over an elevation substantially above the level at which the fruit is immersed in the liquid, and discharging the siphoned fruit and liquid into a pool of the liquid at a level slightly below that at which the friut is immersed, which pool is subjected to substantially atmospheric pressure.

4. The method of hydrating fruit defined by claim 3 in which the liquid in which the fruit is immersed, siphoned, and discharged, contains fluid borne materials for introduction into the fruit.

5. A method of increasing the liquid content of fruit having gas pockets therein in communication with the exterior thereof comprising immersing the articles in a pool of liquid, siphoning the articles and liquid over an elevation substantially above the level at which the articles are immersed in the liquid, and discharging the siphoned articles and liquid into a pool of the liquid at an elevation below that at which the articles are immersed.

6. A method of increasing the liquid content of friut having gas pockets therein in communication with the exterior thereof comprising immersing the articles in a pool of liquid, siphoning the articles and liquid over an elevation substantially above the level at which the articles are immersed in the liquid, and discharging the siphoned articles and liquid at an elevation below that at which the articles are immersed.

7. A fruit hydrating apparatus comprising a feed tank; a receiving tank; fluid in the tanks; a siphon tube having a substantially horizontal portion providing an open end immersed in the fluid in the feed tank, a portion elevated above the fluid in the feed tank, and an open end immersed in the fluid in the receiving tank; a fruit receiving hopper having perforated side walls mounted on the horizontal portion of the siphon tube immersed in the feed tank and in communication with the interior of the siphon tube; an auxiliary tank for fruit treating materials adapted to discharge material therefrom into the feed tank; a metering valve for regulating the flow of material from the auxiliary tank into the feed tank; means connected to the siphon tube for initiating siphoning action therethrough of fluid, fruit, and fruit treating materials; and means connected between the receiving tank and the feed tank for maintaining the siphon action in the siphon tube.

8. A hydrating apparatus for fruit comprising a feed tank; a receiving tank; a siphon tube having an inlet in the feed tank, an outlet in the receiving tank, and an elevated central portion intermediate the inlet and the outlet; liquid in the tanks, the inlet in the feed tank and the outlet in the receiving tank being located at predetermined positions in their respective tanks below the fluid levels therein; means connected to the elevated portion of the tube for evacuating air therefrom; a hopper having perforated walls mounted in the feed tank in communication with the inlet of the tube; a float valve in the receiving tank connected to a source of liquid for maintaining the fluid in said tank at a predetermined level above the perforations in the walls of the hopper; and means connected between the tanks for pumping liquid from the receiving tank into the feed tank at a rate substantially equal to the siphon fluid carrying capacity of the tube and to maintain liquid in the feed tank at a higher level than in the receiving tank.

References Cited in the file of this patent

UNITED STATES PATENTS

| Number | Name | Date |
|---|---|---|
| 1,264,688 | Schilling | Apr. 30, 1918 |
| 1,494,737 | Cournyer | May 20, 1924 |
| 1,607,801 | Nichols | Nov. 23, 1926 |
| 1,908,220 | Chapman | May 9, 1933 |
| 2,057,366 | Chapman | Oct. 13, 1936 |
| 2,162,415 | Allen | June 13, 1939 |
| 2,233,123 | Fritts | Feb. 25, 1941 |
| 2,263,300 | Haverly | Nov. 18, 1941 |